(12) United States Patent
Lause

(10) Patent No.: US 8,724,878 B2
(45) Date of Patent: May 13, 2014

(54) ULTRASOUND IMAGE SEGMENTATION

(75) Inventor: Brian Lause, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 31 days.

(21) Appl. No.: 13/348,790

(22) Filed: Jan. 12, 2012

(65) Prior Publication Data
US 2013/0182924 A1 Jul. 18, 2013

(51) Int. Cl.
G06K 9/00 (2006.01)
A61B 5/05 (2006.01)

(52) U.S. Cl.
USPC .......................................... 382/131; 600/407

(58) Field of Classification Search
USPC .......... 382/128–134, 164, 171, 173; 378/4, 8, 378/21–27, 901, 101; 600/407, 410, 411, 600/425, 427, 433; 128/915, 916, 920, 922
See application file for complete search history.

(56) References Cited

U.S. PATENT DOCUMENTS 6,754,376 B1 * 6/2004 Turek et al. .................. 382/131
6,978,039 B2 * 12/2005 Cline et al. ................... 382/128
8,320,711 B2 * 11/2012 Altmann et al. ............. 382/294
2010/0032575 A1 2/2010 Iagaru et al.
2010/0305441 A1 12/2010 Lin et al.
2011/0188720 A1 8/2011 Narayanan et al.

OTHER PUBLICATIONS

Antoine Leroy, Pierre Mozer, Yohan Payan and Jocelyne Troccaz, Intensity-Based Registration of Freehand 3D Ultrasound and CT-Scan Images of the Kidney, TIMC Lab, IN3S, p. 1-24, France.
Antoine Leroy, Pierre Mozer, Yohan Payan and Jocelyne Troccaz, Rigid Registration of Freehand 3D Ultrasound and CT-Scan Kidney Images, MICCAI, 2004, LNCS 3216, p. 837-844, France.

* cited by examiner

Primary Examiner — Abolfazl Tabatabai
(74) Attorney, Agent, or Firm — Rathe Lindenbaum LLP

(57) ABSTRACT

An apparatus for segmenting ultrasound image data including an ultrasound imaging system configured to generate imaging data of a patient. The ultrasound imaging system includes a transducer, a processing unit and a display. The processing unit is operably coupled to the transducer to receive the generated imaging data. The processing unit is configured to analyze the received imaging data and identify an anatomical element. The processing unit includes instructions to segment the anatomical element utilizing as an initial seed segmentation data for the same anatomical element obtained from a different imaging system.

20 Claims, 4 Drawing Sheets

ULTRASOUND IMAGE SEGMENTATION

BACKGROUND OF THE INVENTION

The present invention relates generally to the field of segmentation of medical images and more particularly, to the segmentation of ultrasound medical images.

Ultrasound or ultrasonography is a medical imaging technique that utilizes sound waves having a high frequency above the audible range. An ultrasound system includes an ultrasound probe having a transducer array, a transmitter and a receiver. The transducer elements convert the backscattered and or reflected waves to electrical signals which are processed by a processing unit to generate a corresponding image that may be displayed. Ultrasound images are displayed in real time and may be stored for further analysis.

BRIEF DESCRIPTION OF THE INVENTION

One embodiment includes an ultrasound imaging system configured to generate imaging data of a patient. The ultrasound imaging system having a transducer probe, a processing unit and a display. The processing unit including a processor operably coupled to the transducer to receive the generated imaging data. The processor configured to analyze the received imaging data and identify an anatomical element from the imaging data. The processing unit including instructions to segment the anatomical element utilizing as an initial seed segmentation data scan for the same anatomical element obtained from a different imaging system.

In another embodiment, a non-transient computer-readable medium containing computer-readable code to direct a processor to receive generated imaging data from an ultrasound transducer; display the imaging data on a display; and segment an anatomical element of the imaging data utilizing as an initial seed segmentation data, in whole or in part, from a scan obtaining the same anatomical element obtained from a different imaging system.

In another embodiment, a method of segmenting ultrasound image data includes receiving ultrasound imaging data at a processing unit; identifying an anatomical element of the ultrasound imaging data; and segmenting the anatomical element with an algorithm utilizing as an initial seed a previously segmented imaging data of the same anatomical element from a different imaging system.

DETAILED DESCRIPTION

Figure 1:
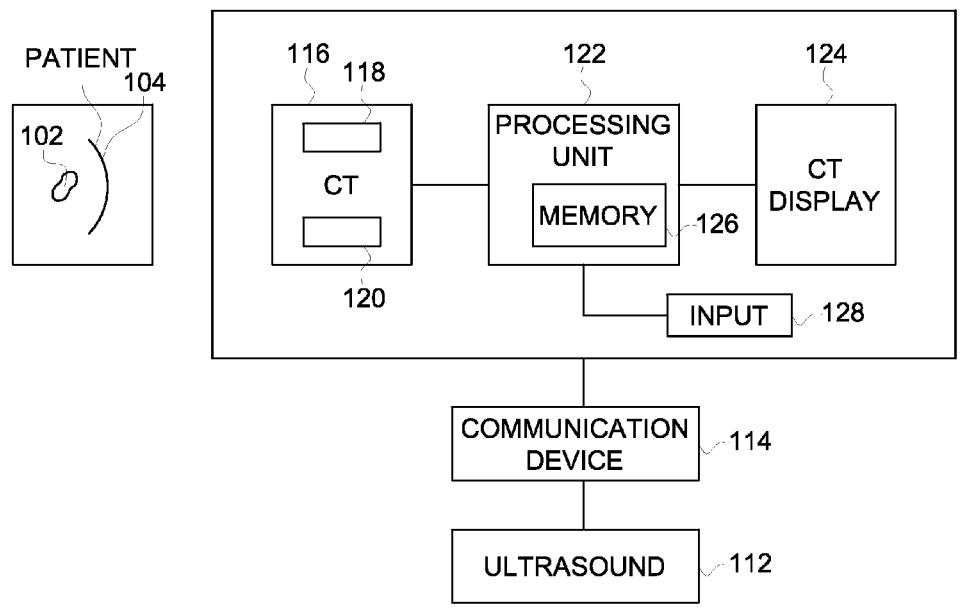
FIG. 1 is a schematic illustration of a system for ultrasound image segmentation.

Referring to FIG. 1, a block diagram of an image processing system 100 is shown in accordance with an exemplary embodiment. Image processing system 100 provides for segmentation of an ultrasound image of an anatomical element 102 within a human body 104 and includes a first imaging system 110 a second ultrasound imaging and segmentation system 112. A communication device 114 transfers certain data from first imaging system 110 to ultrasound imaging and segmentation system 112. First imaging system 110 can be selected from a number of medical imaging devices known in the art for generating a plurality of images of the human body. Imaging devices 110 may be a computed tomography (CT) system; a magnetic resonance imaging (MRI) system; a position emission tomography (PET) system; an ultrasound (US) system; or other medical imaging systems known in the art. In one embodiment first imaging device 110 is a CT system, however it is possible that first imaging device 110 is one of the other medical imaging systems noted above.

First imaging system 110 includes a CT scanner 116 having an x-ray source 118 and x-ray detectors 120. During a CT imaging procedure, a patient typically lies in a horizontal position and is exposed to a plurality of x-rays from x-ray source 118 measured with a series of x-ray detectors 120. A beam of x-rays passes through a particular thin cross-section or "slice" of the patient. The x-ray detectors 120 measure the amount of transmitted radiation. An electronic signal obtained from the x-ray detector 120 is provided to a CT processing unit 122. This information is used to compute the x-ray attenuation coefficient for sample points in the body. A gray scale image is then constructed based upon the calculated x-ray attenuation coefficients. The shades of gray in the image contrast the amount of x-ray absorption of every point within the slice. The slices obtained during a CT scan can be reconstructed to provide an anatomically correct representation of an anatomical element 102 in a region of interest (ROI) within the body 104 of the patient that has been exposed to the x-rays. Regardless of the image data acquisition method, the slices obtained during the CT scan are formed into an array of data by CT processing unit 122 typically consisting of a plurality of sets of three-dimensional coordinates distributed at regular positions about the ROI. The three dimensional coordinates may be provided in a DICOM format. The images obtained from the CT scan may then be displayed on display 124.

Once the initial CT images have been obtained, the three-dimensional data may be segmented to identify specific anatomical elements of interest. The segmentation process classifies the pixels or voxels of an image into a certain number of classes that are homogeneous with respect to some characteristic (i.e. intensity, texture, etc.). In this manner it is possible to isolate and identify the borders of an anatomical element 102 of interest within the human body such as a tumor or a lesion. Once the segmented image is developed, surgeons can use the segmented images to plan surgical techniques.

There are a variety of techniques available to generate a three-dimensional model or structure of the areas of interest within the human body. In one method a seed voxel (volume element) is placed within the anatomical structure of interest in the CT scan and adjacent voxels are successively analyzed and identified as belonging to the same structure generally if they are adjacent to a previously identified voxel and they meet a specified attribute, such as intensity or radiological density. In accordance with any of the known techniques, a 3D image is obtained for visualization on display 124. Creating a segmented CT image involves several operations that may require a significant amount of processing.

CT system may include one or more processing units 122 to receive and process the signals received from the x-ray detectors 120. For purposes of this application, the term "processing unit" shall mean a presently developed or future developed processing unit that executes sequences of instructions contained in a memory. In one example the term "memory" as used herein comprises a non-transient computer-readable medium containing computer code for the direction of controller. Execution of the sequences of instructions causes the processing unit comprising controller to perform steps such as generating the x-rays and processing and storing the signals received from the x-ray detectors. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, CT processing unit 122 may be embodied as part of one or more application-specific integrated circuits (ASICs). Unless otherwise specifically noted, the processing unit is not limited to any specific combination of hardware circuitry and software, nor to any particular source for the instructions to be executed.

According to one embodiment, processing unit 122, following instructions contained in memory 126 receives the signals from the CT x-ray detectors 120 and analyzes such signals, wherein the results of such analysis are presented on display 124 and stored for subsequent processing to create a two dimensional and/or three dimensional array of the area scanned and subsequently allowing segmentation of that array.

A number of methods are known in the art to segment an anatomical element within CT data. As noted above the use of a seed voxel or volume element may be used as a starting point to identify the borders of the segmented anatomical element. The CT data array may be displayed on a display. An input device 128 such as a mouse, keyboard, touch screen or other interface may be used to identify the starting point from the display on the anatomical element to begin the segmentation process. An iterative algorithm may be used to fully identify the two dimensional and/or three dimensional boundaries of the segmented region. The boundary of the anatomical element may be referred to as the contour map or in the case of using CT data a CT contour map. The contour map may be in the form of data points that are located on the outer periphery or boundary of the anatomical element, or may be in the form of an equation with given parameters whose result is the boundary of the anatomical element within the CT image data.

Knowing the two dimensional and three dimensional boundaries of the segmented region allows for the calculation of the area and volume of the segmented anatomical element. The CT contour map of the segmented anatomical element and area (cm$^2$) and volume (cm$^3$) values may be stored in memory 126 for future use and reference.

In one embodiment the CT contour map and associated area and volume parameters are communicated via communication device 114 to ultrasound segmentation system 112. Communication device 114, may be a wired or wireless connection between CT processing unit 122 and the ultrasound imaging and segmentation system 112. Alternatively, communication device 114 may be a portable memory device such as a flash drive or other device known in the art that can store the CT Scan DICOM data, the contour map and associated area and volume data and then be operatively connected to and/or stored in ultrasound system 112. Alternatively, the CT DICOM data, contour map and associated metrics maybe placed on a network to be subsequently accessed by the ultrasound system 112.

In one example the anatomical element of the CT data that was segmented and stored in memory may be a tumor or lesion that is to be treated. After treatment of the anatomical element identified and segmented from the CT data, it may be desirable to determine the effectiveness of the treatment. One way to determine the effectiveness of the treatment of a tumor is to identify the change in size of the tumor after the treatment. It may be possible to obtain a second CT scan and segment the anatomical element and then compare the volume of the first CT segmented volume of the anatomical element with a second CT segmented volume of the anatomical element. However, since a CT scan involves the use of x-rays, follow-up CT scans may not be warranted or desirable.

Ultrasound scanning provides a process that does not require the use of x-rays and may be used for follow-up diagnosis of the anatomical element such as a tumor or lesion. In one example, after the patient has received treatment for a tumor and a period of time has lapsed from the time that the CT scan was obtained, an ultrasound scan may be obtained as a follow-up to the original CT scan. This second scan allows a comparison of the tumor after treatment with the tumor as it existed prior to treatment thereby providing an indication of the effectiveness of the treatment.

As noted above through the segmentation process the boundary of the tumor of interest, or anatomical element, may be modeled from the CT scan data. The use of ultrasound scanning to determine the volume of an anatomical element provides certain challenges. Unlike a CT scan, ultrasound scanning may not provide an entire image of the tumor, or anatomical element, on a display at a single point in time during an ultrasound scan. The area of the ultrasound scan that may be displayed at any one time on the display may not cover the entire anatomical element such as a tumor. Additionally, ultrasound systems may not provide scan data with the same contrast resolution as a CT scan making it more challenging to identify and segment the anatomical element such as a tumor with an ultrasound scanning device.

The use of the previously CT segmented anatomical element may be used to enhance the speed and accuracy of segmentation of the newly acquired ultrasound scan data. Since the anatomical element may not be visualized in its entirety at a single time and the contrast resolution or consistency of the image presents difficulties. The contour map of the CT segmented anatomical element is used as a starting seed for segmenting the ultrasound data. The use of the CT segmented anatomical element as a seed for segmentation provides for a direct comparison of the anatomical element and allows for the identification of changes such as growth or regression of the anatomical element or tumor from the first CT scan to a follow-up ultrasound scan.

Figure 2:
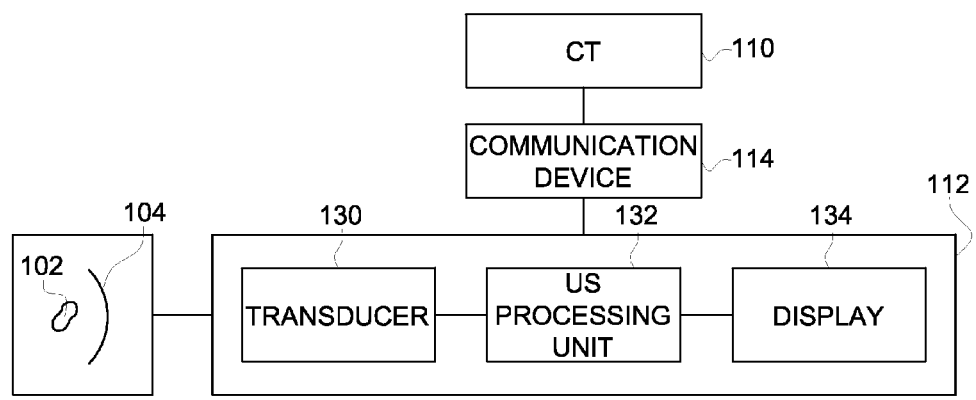
FIG. 2 is a schematic illustration of ultrasound system of FIG. 1.
Figure 3:
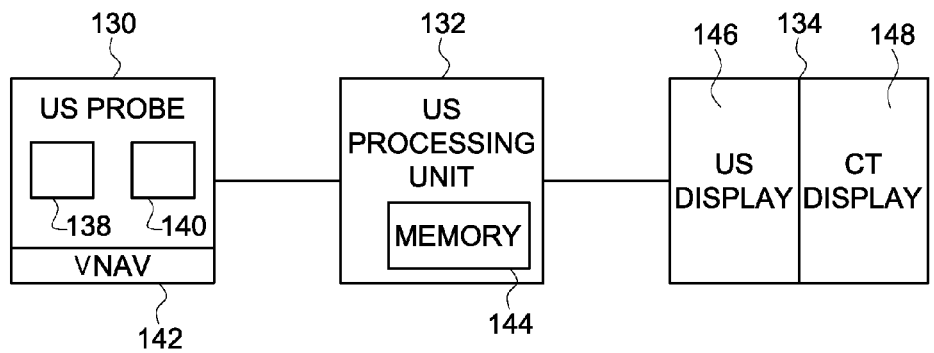
FIG. 3 is a schematic illustration of the ultrasound system components of FIG. 2.

Referring to FIGS. 2 and 3, ultrasound system 112 includes a transducer 130, an ultrasound processing unit 132, a display 134, and an input device 136. Transducer 130 includes a transmitter 138 and a receiver 140. According to one embodiment ultrasound processing unit 132 following instructions contained in a memory 144, receives ultrasound echo signals from the ultrasound transducer 130 and analyzes such signals, wherein the results of such analysis are presented on display 134. In some embodiments, processing unit 132 may generate control signals adjusting or varying the display of signals and/or results on display 134. In some embodiments processing unit 132 may further generate control signals adjusting the operation of probe 130.

In one embodiment a volume navigation sensor 142 is operatively secured to transducer 130. The volume navigation sensors allows the processing unit 132 to determine the location and orientation of the transducer 130 as the transducer = is moved relative to a patient. In this manner volume navigation allows for three dimensional tracking of the location of the ultrasound transducer 130 as well as proving information regarding the specific area of the patient being scanned and imaged by the transducer 130. Using the volume navigation system it is possible to register and fuse, where fusion is a constant registration, the ultrasound view with the corresponding physical location represented in the CT image.

The CT data set and CT contour map previously obtained from a patient at an earlier time, usually pre-treatment of the anatomical element, is stored in memory device 144 such as RAM or a CD or hard drive device or any other such device or network that can be accessed by the ultrasound processing unit 132. In one embodiment the ultrasound image is registered with the previously stored CT data set. An ultrasound scan of the patient is taken in a given orientation that allows ultrasound processing unit 132 to register the ultrasound data with the stored CT data set. Once the registration is made by appropriate comparison of data points, the ultrasound processing unit identifies any further movement of the ultrasound probe 130 by use of the volume navigation sensors. In this manner, ultrasound images are directly fused with the corresponding data of the CT image data set.

The ultrasound image and corresponding images from the CT data set may be displayed in side by side format on a display. As an operator moves the transducer probe 130 the image generated from the ultrasound is displayed on a display and ultrasound processing unit 132 maintains registration and sends the corresponding image from the CT data set to be displayed on the display as well. Accordingly, as transducer 130 is moved the resulting ultrasound image is displayed as well as the corresponding image from the CT data set.

Referring to FIG. 3 in one embodiment display 134 displays the ultrasound image on one portion 146 of display 134 and the corresponding previously stored CT image is displayed on another portion 148. In one embodiment the CT image displayed on portion 148 may show a much larger portion or area of the patient's body than the ultrasound image being displayed on portion 146 of display 134. As a result, an operator looking for a particular anatomical element, could identify the anatomical element on the CT image and then make adjustment of the location and orientation of the transducer 130 to find the corresponding anatomical element in the patient with the ultrasound scan. In an alternative embodiment two separate displays are used to display the ultrasound image and the CT image respectively. In yet another embodiment, the ultrasound scan data and CT scan data may be superimposed on one another.

The anatomical element may be identified on the CT data set either during the process of obtaining, segmenting and storing the CT data set or during the ultrasound imaging process. Identification may be made by the use of input device 128 in the CT system or input device 136 of the ultrasound system. Identification may be made with a symbol such as a star or plus sign located at the point of origin or may be identified with an increasing and decreasing intensity of light, with growing or decreasing circles or spheres about the anatomical element, or any other type of visual indicator alerting the operator to the location of the anatomical element.

The display of the previously captured and stored CT scan allows the operator to more easily navigate the ultrasound probe to direct the ultrasound to the proper position on the patient to obtain the ultrasound image of interest. By displaying the relevant image of the CT scan that correlates to the location of the ultrasound image being obtained, the operator can more easily manipulate the ultrasound probe to capture the anatomical element interest. In one embodiment, the display of the CT scan may show a larger region than the ultrasound display with an indicator or maker showing on the CT scan the corresponding position of the images being captured by the ultrasound. In another embodiment the operator may be given an indication by use of an arrow or other indication on the display providing the direction to move the ultrasound probe to identify anatomical element, in this example a tumor.

In one embodiment the ultrasound processing unit may provide a visual indication of direction that the transducer 130 should be manipulated relative to a patient to locate the identified anatomical element on the CT scan with the ultrasound system. The visual indication may provide an image of a transducer at the appropriate angle and/or location on the patient relative to the actual location of the trasnsducer 130. For example if the probe needs to be moved from an angle of 90 degrees to an angle of 60 degrees or 120 degrees relative to the patient, an icon may show a transducer at 90 degrees with an arrow pointing to an image of a probe at 60 degrees or 120 degrees respectively. Similarly, if the transducer needs to be moved away from or towards the operator an image may show a representation of a patient with the transducer positioned relative to the representation of the patient of the actual location of the transducer with an arrow showing where the transducer should be moved to obtain the necessary anatomical element. Further, processing unit 132 may automatically without action by the operator adjust the acquisition and display so that the appropriate depth within the patient is obtained. Alternatively, the system may provide an indication to the operator with an icon that the acquisition and/or display needs to be adjusted to obtain the appropriate image.

When the operator has obtained the ultrasound image of the anatomical element on display 134, processing unit begins the segmentation of the anatomical element of the ultrasound image. Processing unit 132 utilizes the stored CT contour map of the anatomical element as an initial seed to segment the corresponding anatomical element of the ultrasound data. Since the CT contour map is of the same anatomical element taken at a different time, the segmentation process may take place during the ultrasound imaging process.

Several segmentation algorithms have been developed for CT data sets because they are very consistent and cover large areas. The ultrasound data of the anatomical element can use the output or contour map of the CT data segmentation as a seed for the ultrasound segmentation algorithm.

The algorithm used to segment the anatomical element from the CT data is passed along with the CT dataset to the ultrasound system. The processing unit 132 of the ultrasound system 112 stores the CT segmented dataset in memory 144 of the ultrasound processing unit 132. In real time, the processing unit 132 registers the CT dataset to the ultrasound image which will also register the segmentation information to the ultrasound data. It is also contemplated that the ultrasound data covering the anatomical element may be captured and stored in memory 144 to allow subsequent processing to identify the volume of the anatomical element. This will allow an operator to review the ultrasound data after the ultrasound scan has been completed and conduct the segmentation of an anatomical element or perhaps other regions of interest that may not have been evident or considered prior to or during the ultrasound scan.

Segmentation may be a two dimensional process and/or a three dimensional process. The two dimensional process will segment the ultrasound image of a single plane. As the ultrasound transducer 130 is moved and obtains additional slices or planes through the ROI, each slice may be segmented based on a corresponding CT contour map in which the corresponding contour map or previously segmented slice or plane of the CT data set is used as a starting seed. In this manner a three-dimensional segmentation can be determined using a number of individual segmented planes of the ultrasound data.

The segmentation algorithm for the structure for the ultrasound data would take as an input the segmented CT data set or contour map and use that as an initial seed, or as part of the cost equation or growth equation in one algorithm. Other known algorithms that use a starting seed may also be used. In this way the segmentation of the ultrasound data could be completed more quickly and/or more accurately, and could provide a comparison to the original anatomical element. In one embodiment, the operator or user can identify the tumor in the ultrasound image using an input device 136 such as a keyboard or mouse to identify a point within the anatomical element shown in the ultrasound display. Once the anatomical element has been positively identified by the operator, the segmentation of that anatomical element may begin using the CT segmented data or contour map as the seed for the algorithm.

Ultrasound processing unit 132 calculates the area of the anatomical element of the segmented ultrasound image and provides a display of the results on display 134. Similarly, ultrasound processing unit 132 calculates the volume of the anatomical element of the segmented ultrasound images and provides a display of the results on display 134. In addition to the area, the change in value from the CT segmented anatomical element area is also displayed. It is the change in the area and/or volume of the anatomical element from the ultrasound scan and the previously obtained anatomical element from the CT scan provides an indication of the effectiveness of any treatment to the anatomical element. The change in the area and/or volume may be displayed as actual values or as a percent change.

In addition to providing the change in size and volume of the anatomical element, a visual image may be shown superimposing the areas of increase and/or decrease across the entire anatomical element. It is possible that only a portion of the anatomical element has been reduced while another portion may have increased. It is possible that one portion of the anatomical element was treated while another portion was not. The display would show the change in area and/or volume for both portions of the anatomical element. Where the entire anatomical element may not be obtained in the ultrasound scan due to another anatomical feature such as a bone blocking a portion of the anatomical element, processing unit 136 may approximate the blocked portion of the anatomical element by extrapolation of the areas of the anatomical element that can be scanned on either side of the blocking feature. The extrapolated portions of the anatomical element can then be compared to the corresponding portions in the CT scanned data.

Figure 4:
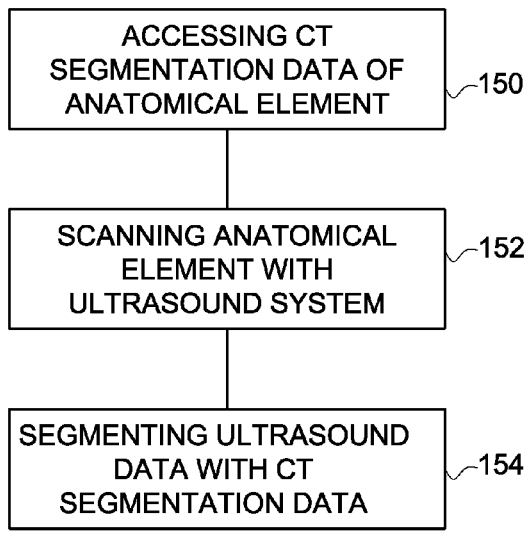
FIG. 4 is a flow diagram of an exemplary ultrasound segmentation process.

Referring to FIG. 4 the process of segmenting an ultrasound image of an anatomical element that was previously segmented from a CT data set includes the step 150 of accessing a contour map of a previously CT segmented anatomical element in an ultrasound system. The anatomical element of a patient is scanned utilizing an ultrasound imaging system 152 in step 152. The ultrasound anatomical element is segmented utilizing the CT contour map as an initial seed of a segmentation process in step 154.

Figure 5:
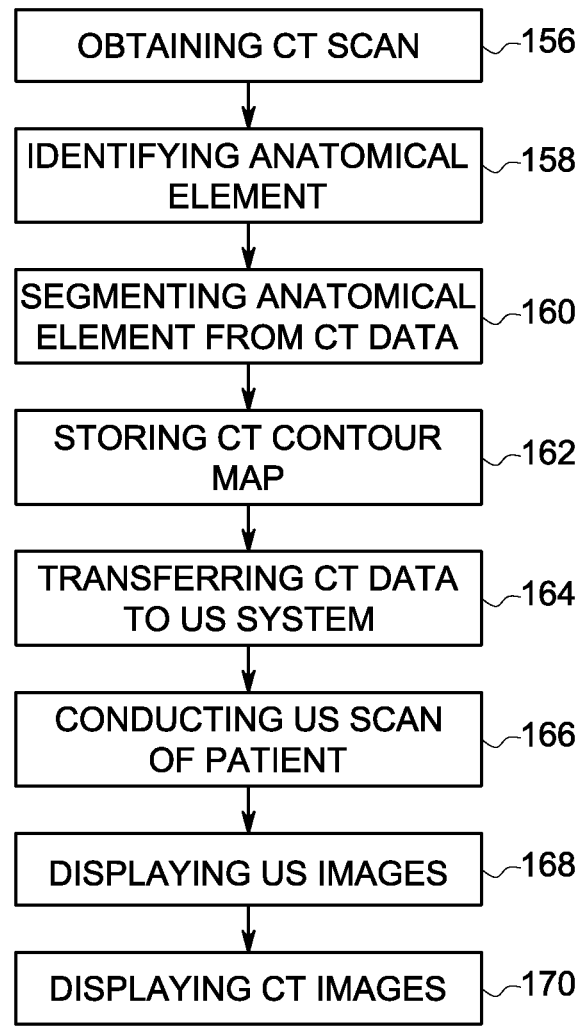
FIG. 5 is a flow diagram of obtaining ultrasound images of a region of interest of FIG. 4.
Figure 6:
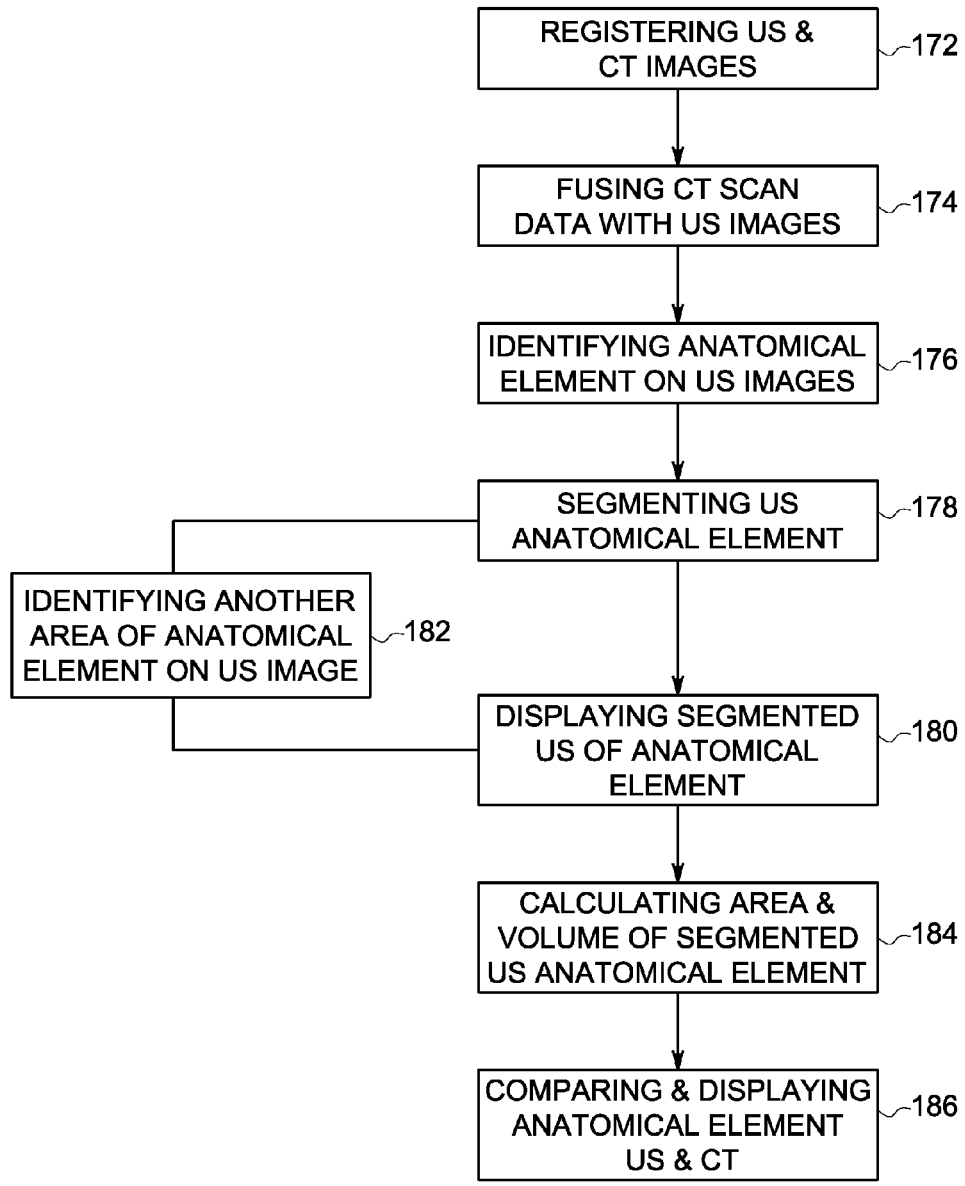
FIG. 6 is a flow diagram of the ultrasound segmentation process of FIG. 4.

Referring to FIGS. 5 and 6, the process of segmenting an ultrasound image includes the step 156 of obtaining a CT scan of an anatomical element of a patient. The anatomical element is identified in step 158 utilizing an input device and identifying a location with the anatomical element of the CT data set displayed on a display. In step 160 a CT processing unit segments the anatomical element using known techniques with instructions stored in memory of the CT system. A contour map of the segmented anatomical element from the CT data set is stored in memory in step 162.

After a patient has been treated and an operator desires to determine the effectiveness of the treatment a second ultrasound scan can be obtained. The CT scan data set and contour map is transferred to the ultrasound system in step 164.

Ultrasound images are obtained of the patient at 166 and displayed on a first portion of a display at 168. The images from the CT data set of the anatomical element of the same patient taken earlier are displayed on the second portion of the display at 170. Ultrasound images of the patient with the anatomical element of interest are obtained and registered to the CT scan data set utilizing the ultrasound processing unit in step 172. Once the ultrasound scans are registered to the CT scan data, volume navigation is used at 174 to fuse the previously stored CT scan data with the ultrasound imaging data being generated. The anatomical element on the ultrasound image is identified at 176 by an operator by using an input device and the ultrasound display. In another embodiment the anatomical element on the ultrasound image is identified automatically without operator input by the ultrasound processing unit once the anatomical element on the ultrasound image is registered to the anatomical element of the previously stored CT scan data. In the automatic identification of the anatomical element on the ultrasound image, the processing unit compares the ultrasound image being displayed with a previously identified anatomical element on the CT scan data. When the ultrasound image being captured and displayed corresponds with the location of the anatomical element in the CT scan data, the processing unit automatically identifies, stores and processes the ultrasound image for further processing.

Once the anatomical element of the ultrasound scan has been identified either with the input from an operator or automatically by the processing unit, the ultrasound processing unit segments the anatomical element of the ultrasound scan data. Segmentation of the anatomical element of ultrasound image at 178 includes applying an algorithm stored in memory utilizing the contour map of the previously stored and segmented anatomical element of the CT scan data. The contour map of the anatomical element from the CT scanned data is used as an initial seed for segmenting the ultrasound anatomical element.

Segmenting the anatomical element at 154 of the ultrasound data includes accessing the CT segmented contour map of the anatomical element from a previously segmented CT data set of a given patient. As discussed above, at 172 the ultrasound image data is registered to the CT scan data. Once the CT scan data is fused with the ultrasound image data being obtained the anatomical element is located utilizing the ultrasound transducer 132 at 174. Segmenting the anatomical element from the ultrasound scan is then performed at 178. Segmenting the anatomical element from the ultrasound scan at 178 includes identifying the anatomical element of the ultrasound image by the ultrasound processing unit may be conducted as noted above without the assistance of the operator. In one embodiment the processing unit compares the ultrasound image being obtained with the previously identified anatomical element of the CT data set. After the previously identified anatomical element of the CT data set corresponds to the ultrasound image on the display, the processing unit applies the corresponding contour map of the stored CT scan as an initial seed for segmenting the particular slice or CT scanned plane. The segmented anatomical element from the ultrasound scan is displayed on the ultrasound display at 180. Segmenting the anatomical element may be performed repeatedly at 182, as different areas of the anatomical element are obtained in the ultrasound scan. The steps of identifying and segmenting may be repeated for additional ultrasound images obtained at a different plane extending through the anatomical element. The steps of 178, 180 and 182 are repeated sufficient number of times to create an approximation of a volume of the anatomical element from the ultrasound data.

Referring to FIG. 6, at 184 and 186 the segmented ultrasound anatomical element includes calculating the area and/or volume of the anatomical element and displaying the change in size and/or volume of the anatomical element from CT scan data and the ultrasound scan. The step of displaying the change in the size and volume of the anatomical element includes showing the change in size and/or volume of different portions of the anatomical element.

The output could include a rendering showing the specific regions of the tumor that had changed shape and/or volume such that the regions of change could be identified as a percent change from the pre-treatment tumor as identified from the previously segmented CT tumor.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus for segmenting ultrasound image data, comprising:
    an ultrasound imaging system configured to generate imaging data of a patient, the ultrasound imaging system having a transducer probe, a processing unit and a display;
    the processing unit being operably coupled to the transducer probe to receive the generated imaging data, the processing unit configured to:
        analyze the received imaging data;
        identify an anatomical element from the imaging data;
    the processing unit including instructions to segment the anatomical element obtained from the ultrasound imaging system utilizing as an initial seed a segmentation data scan for the same anatomical element obtained from a different imaging system.

2. The system of claim 1, wherein the different imaging system is a computed tomography system.

3. The system of claim 2, wherein the initial seed is a contour map of the segmented anatomical element, in part or in whole, registered to a previously acquired data scan of the anatomical element.

4. The system of claim 3, further including an input device including one of a mouse, keyboard and touch screen configured to identify the anatomical element of interest on the display.

5. The system of claim 4, further including a sensor operatively connected to transducer probe tracking the movement and location of the transducer.

6. The system of claim 5, wherein the processing unit is configured to display the generated imaging data of the anatomical element from the ultrasound transducer on the display and simultaneously display an image of a corresponding anatomical element of the patient from the computed tomography system data.

7. The system of claim 6, wherein the processing unit is configured to calculate the area or volume of the segmented anatomical element on the ultrasound imaging data and compare with the area or volume of the corresponding anatomical element from the computed tomography system data.

8. The system of claim 7, where in the processing unit is configured to communicate the location of a segmented anatomical element, in whole or in part, from the computed tomography system data and display a marker on the ultrasound display illustrating the direction and distance to move the transducer probe to visualize the location corresponding to the segmented anatomical element on the ultrasound imaging system.

9. A system for segmenting ultrasound image data, comprising:
    a non-transient computer-readable medium containing computer-readable code to direct a processor to:
    receive a generated imaging data from an ultrasound transducer;
    display the imaging data on a display;
    segment an anatomical element of the imaging data from an ultrasound imaging system utilizing as an initial seed segmentation data, in part or in whole, from a scan containing the same anatomical element obtained from a different imaging system.

10. The system of claim 9, wherein the processor is further configured to compare a data set from the different imaging system and compare imaging data from the ultrasound transducer and provide a signal when the imaging data from the ultrasound transducer corresponds to a predetermined anatomical element on the data set from the different imaging system.

11. The system of claim 10, wherein the processor is further configured to automatically segment the imaging data from the ultrasound system when the imaging data from the ultrasound system corresponds to the location of the segmented anatomical element from the different imaging system.

12. The system of claim 11, wherein the processor is further configured to calculate a second volume of the segmented anatomical element of the imaging data from the ultrasound transducer and compare the second volume with a calculated first volume of the corresponding segmented anatomical element of the different imaging system.

13. The system of claim 12, wherein the processor is further configured to calculate a direction and a distance the ultrasound transducer should be moved so that the ultrasound imaging data will correspond to the predetermined anatomical element on the data set from the different imaging system.

14. A method for segmenting ultrasound image data, comprising:
    receiving ultrasound imaging data at a processing unit;
    identifying an anatomical element of the ultrasound imaging data;

segmenting an anatomical element within the region of interest from the ultrasound imaging date with an algorithm utilizing as an initial seed previously segmented imaging data of the same anatomical element from a different imaging system.

15. The method of claim 14, further including registering the ultrasound image data with the image data from the different imaging system.

16. The method of claim 15, further including calculating an area on any of a plurality of slices of the segmented cut into a two-dimensional slice.

17. The method of claim 16, further including calculating the volume of the segmented anatomical element.

18. The method of claim 17, further including displaying the ultrasound image data and the image data from different imaging system on the same display.

19. The method of claim 18, further including tracking the movement of an ultrasound transducer probe providing the image data and providing information to operator on the direction to move the ultrasound transducer probe to locate the anatomical element.

20. The method of claim 19, including displaying a comparison of the volume of the segmented anatomical element of the ultrasound imaging data with the corresponding volume of the segmented anatomical element from the image data from the different imaging system, where the different imaging system is a computed tomography system, wherein the anatomical element from the ultrasound system and the anatomical element from the computed tomography system are from a single patient.

* * * * *